(12) United States Patent
Strongrich et al.

(10) Patent No.: US 12,455,115 B2
(45) Date of Patent: Oct. 28, 2025

(54) SYSTEM AND METHOD FOR MEASURING RAPID DECOMPRESSION ICE NUCLEATION IN LYOPHILIZATION

(71) Applicant: Purdue Research Foundation, West Lafayette, IN (US)

(72) Inventors: Andrew Strongrich, West Lafayette, IN (US); Alina Alexeenko, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 412 days.

(21) Appl. No.: 18/036,067

(22) PCT Filed: Nov. 9, 2021

(86) PCT No.: PCT/US2021/058604
§ 371 (c)(1),
(2) Date: May 9, 2023

(87) PCT Pub. No.: WO2022/103745
PCT Pub. Date: May 19, 2022

(65) Prior Publication Data
US 2023/0408195 A1 Dec. 21, 2023

Related U.S. Application Data

(60) Provisional application No. 63/112,089, filed on Nov. 10, 2020.

(51) Int. Cl.
*F26B 5/06* (2006.01)
*A61K 9/19* (2006.01)
(Continued)

(52) U.S. Cl.
CPC .............. *F26B 5/06* (2013.01); *A61K 9/19* (2013.01); *B01L 9/00* (2013.01); *G01N 33/15* (2013.01);
(Continued)

(58) Field of Classification Search
CPC .. F26B 5/06; F26B 25/22; A61K 9/19; G01N 33/15; G01K 1/14; G01K 1/024;
(Continued)

(56) References Cited

U.S. PATENT DOCUMENTS 4,966,469 A   10/1990  Fraser et al.
5,280,678 A * 1/1994  Jennings ................. F26B 21/06
                                                34/493
(Continued)

FOREIGN PATENT DOCUMENTS

TW          M 543 845          6/2017

OTHER PUBLICATIONS

Milton et al., Evaluation of Manometric Temperature Measurement as a Method of Monitoring Product Temperature During Lyophilization, PDA J Pharm Sci and Tech 1997, 51 7-16.
(Continued)

*Primary Examiner* — Randy W Gibson
(74) *Attorney, Agent, or Firm* — Piroozi-IP, LLC

(57) ABSTRACT

An environmental sensor system for monitoring nucleation in a lyophilization chamber is disclosed which includes a sensor unit, including a temperature sensor, a pressure sensor, and a reader circuit in electronic communication with the sensor unit; wherein the sensor unit is adapted to sealingly fit around a vial placed in a lyophilization chamber and further adapted to be energized by the reader circuit and provide signals associated with temperature and pressure within the vial in a non-invasive manner in which the sensors are configured to be positioned in a headspace
(Continued)

within the vial but not in contact with product within the vial.

13 Claims, 10 Drawing Sheets

(51) Int. Cl.
| | | |
|---|---|---|
| *B01L 9/00* | (2006.01) | |
| *G01K 1/14* | (2021.01) | |
| *G01N 33/15* | (2006.01) | |
| *G05D 22/02* | (2006.01) | |
| *G05D 23/19* | (2006.01) | |
| *G05D 27/02* | (2006.01) | |

(52) U.S. Cl.
CPC .............. *G01K 1/14* (2013.01); *G05D 22/02* (2013.01); *G05D 23/1904* (2013.01); *G05D 23/1917* (2013.01); *G05D 27/02* (2013.01)

(58) Field of Classification Search
CPC .......... G01K 1/026; G05D 1/09; G05D 22/02; G05D 23/1904; G05D 23/1917; G05D 27/02; B01L 9/00; B01L 13/50825; B01L 2300/0609
See application file for complete search history.

(56) References Cited

U.S. PATENT DOCUMENTS

| | | | |
|---|---|---|---|
| 6,971,187 | B1 | 12/2005 | Pikal et al. |
| 7,520,670 | B2* | 4/2009 | Schwegman .......... G01K 1/024 374/150 |
| 8,117,005 | B2* | 2/2012 | Barresi .................... F26B 5/06 702/136 |
| 9,249,446 | B2 | 2/2016 | Suslick et al. |
| 9,453,675 | B2 | 9/2016 | Gasteyer, III et al. |
| 9,488,410 | B2* | 11/2016 | Sawada .................... F26B 5/06 |
| 10,641,661 | B2* | 5/2020 | Ganguly ................ G01K 1/024 |
| 11,243,029 | B2* | 2/2022 | Strongrich ............. F26B 25/22 |
| 11,340,015 | B2* | 5/2022 | Hansen .............. G06K 7/10089 |
| 11,609,587 | B2* | 3/2023 | Brower ............... G05D 23/1919 |
| 11,635,256 | B2* | 4/2023 | Strongrich ............. G01N 25/14 34/92 |
| 11,762,403 | B2* | 9/2023 | Brower .................... G01K 1/14 422/68.1 |
| 12,398,953 | B2* | 8/2025 | Strongrich ............. F26B 5/044 |
| 2008/0224634 | A1 | 9/2008 | Scilia |
| 2012/0102977 | A1 | 5/2012 | Cheng et al. |
| 2015/0007441 | A1* | 1/2015 | Lee ........................ F26B 25/22 34/88 |
| 2016/0265984 | A1* | 9/2016 | Peroulis .................. H04W 4/70 |
| 2018/0036695 | A1 | 2/2018 | Karatsinides |
| 2018/0274986 | A1 | 9/2018 | Ganguly et al. |
| 2018/0306763 | A1 | 10/2018 | Brucker et al. |
| 2019/0390903 | A1 | 12/2019 | Knight |
| 2020/0201369 | A1 | 6/2020 | Brower et al. |
| 2020/0340743 | A1 | 10/2020 | Strongrich et al. |
| 2022/0397346 | A1* | 12/2022 | Strongrich .............. F26B 5/044 |

OTHER PUBLICATIONS

Zhang et al., Distribution of Vapor Pressure in the Vacuum Freeze-Drying Equipment, Mathematical Problems in Engineering, vol. 2012, Article ID 921254, 10 pages, 2012.
Massey, Heat and Mass Transfer in Semi-Porous Channels With Application to Freeze-Drying, Iht. J. Heat Mass Transfer. vol. 15, pp. 493-502, 1972.
Rasetto et al., Model based-monitoring of a non-uniform batch in a freeze-drying process, 18th European Symposium on Computer Aided Process Engineering, 2008.
Rasetto et al., On the Use of a Dual-Scale Model to Improve Understanding of a Pharmaceutical Freeze-Drying Process, Journal of Pharmaceutical Sciences, vol. 99, No. 10, Oct. 2010.
Zhu et al., Predictive models of lyophilization process for development, scale-up/tech transfer and manufacturing, European Journal of Pharmaceutics and Biopharmaceutics 128, 363-378, 2018.
Fissore et al., Process analytical technology for monitoring pharmaceuticals freeze-drying—A comprehensive review, Drying Technology,2018, vol. 36, No. 15, 1839-1865.
Ganguly et al., Spatial Variation of Pressure in the Lyophilization Product Chamber Part 1: Computational Modeling, AAPS PharmSciTech, vol. 18, No. 3, Apr. 2017.
Sane et al., Spatial Variation of Pressure in the Lyophilization Product Chamber Part 2: Experimental Measurements and Implications for Scale-up and Batch Uniformity, AAPS PharmSciTech, vol. 18, No. 2, Feb. 2017.
Barresi et al., Use of computational fluid dynamics for improving freeze-dryers design and process understanding. Part 1: Modelling the lyophilisation chamber, European Journal of Pharmaceutics and Biopharmaceutics 129 (2018) 30-44.
ISR for PCT/US2021/58356.
ISR for PCT/US2021/58604.
Jiang et al., Multi-Point Wireless Temperature Sensing System for Monitoring Pharmaceutical Lyophilization. Front. Chem, vol. 6, Article 288, Jul. 17, 2018.
Oddone et al., Non-Invasive Temperature Monitoring in Freeze Drying: Control of Freezing as a Case Study, Drying Technology, 33: 1621-1630, Aug. 31, 2015.
Sensirion, Application Note Dew-point Calculation, www.sensirion.com/humidity, Oct. 3, 2006.
Ellab: Tracksense Lyopro, Sep. 30, 2021 (Sep. 30, 2021).
Ellab: Track sense Lyopro, Feb. 28, 2021 (Feb. 28, 2021).
Oddone Irene Fulginiti Daniele, Non-Invasive Temperature Monitoring in Freeze Drying: Control of Freezing as a case Study, Drying Technology, Aug. 31, 2015.
Ellab Validation & Monitoring Solutions, Presenting TrackSense LyoPro at the LyoConference 2021, Jul. 19, 2021.

* cited by examiner

SYSTEM AND METHOD FOR MEASURING RAPID DECOMPRESSION ICE NUCLEATION IN LYOPHILIZATION

CROSS-REFERENCE TO RELATED APPLICATIONS

The present patent application is a 35 U.S.C. § 371 Nationalization Application of and claims the priority benefit of the International Patent Application Serial No. PCT/US21/58604 filed Nov. 9, 2021, which is related to and claims the priority benefit of U.S. Provisional Patent Application Ser. No. 63/112,089 filed Nov. 10, 2020 and titled "SYSTEM AND METHOD FOR MEASURING RAPID DECOMPRESSION ICE NUCLEATION IN LYOPHILIZATION", the contents of each of which are hereby incorporated by reference in its entirety into the present disclosure.

STATEMENT REGARDING GOVERNMENT FUNDING

None.

TECHNICAL FIELD

The present disclosure generally relates to lyophilization, and in particular, to a method of measuring rapid decompression ice nucleation in lyophilization.

BACKGROUND

This section introduces aspects that may help facilitate a better understanding of the disclosure. Accordingly, these statements are to be read in this light and are not to be understood as admissions about what is or is not prior art.

Lyophilization is a process by which water is removed from items, such as pharmaceutical to improve preservation and shelf life. In general, lyophilization works by first freezing the item to be preserved, then by reducing ambient pressure, and then finally allowing removal of water vapor by sublimation.

In the above-described process, freezing is a critical phase of the lyophilization process due to its impact on drying performance, batch homogeneity, and/or possible degradation in protein formulations. A typical freezing process takes place in four discrete stages: supercooling, primary ice nucleation, secondary ice nucleation, and solidification. During supercooling, the temperature of the sample is reduced below its equilibrium freezing temperature into a metastable state. The transition to primary ice nucleation is identified by the formation of the first ice crystal nucleus. Secondary ice nucleation corresponds to the growth of the ice nucleus and is met with a rapid rise in temperature to the equilibrium freezing point due to the release of latent heat at the liquid-ice interface. Here, the energy release balances the heat transfer out of the solution, marking the beginning of the much slower solidification process. The ability to precisely control this sequence of events across the batch is highly desirable and has been demonstrated using several methods.

For example, controlled ice nucleation (CIN) refers to a technique to control the onset of primary ice nucleation. In the absence of CIN, products have been shown to undergo primary ice nucleation at temperatures of −20° C. in a laboratory environment and as low as −30° C. at the manufacturing scale. At these high degrees of supercooling, the formulation undergoes a rapid and thorough ice crystallization with randomized nucleation, leading to high pore density and a correspondingly high vapor mass transfer resistance. This morphology is unfavorable as it drives up primary drying time and increases frozen layer temperature. The stochastic nature of the ice nucleation leads to variations in supercooling temperature within the batch and ultimately contributes to heterogeneity in drying characteristics among the vials.

The correlation between supercooling and pore size stems from the behavior of the crystal growth. At high degrees of supercooling, the tip velocity of the ice crystal is much faster than its lateral component, producing a needle-like structure. This network of thin interconnected crystal filaments becomes the low-conductance passages through which sublimed water vapor eventually flows. At low degrees of supercooling the tip velocity is comparable to the lateral component, resulting in dendritic ice crystals with a larger cross section and greater conductance.

In addition to morphology, the rapid freezing associated with deep supercooling has also been shown to place unwanted stresses on the product, potentially leading to protein denaturation, aggregation, pH shifts, and phase separation. The issue of small pore size may be rectified by annealing. However, this step consumes valuable processing time and energy. The goal of the CIN process is to induce ice nucleation in all vials simultaneously at a low degree of supercooling. Several techniques have been demonstrated in the literature for inducing ice nucleation including "ice fog", vacuum-induced surface freezing (also known as snap freezing), ultrasound, electro-freezing, and rapid depressurization.

Rapid Decompression CIN (RD-CIN) is one of the commercial technologies currently available, relying on the sudden discharge of pressurized inert gas to induce primary nucleation. Under this method, the samples are first supercooled in the pressurized lyophilization chamber. Following equilibration at the target ice nucleation temperature, the high-pressure ballast is suddenly released to the surrounding atmosphere, leading to a rapid decrease in chamber pressure (i.e. depressurization) and also sudden decrease in gas temperature. This coupling between the pressure and temperature is exploited in refrigeration and gas liquefaction applications and is commonly known as Joule-Thompson cooling. In lyophilization, the timeframe for this process is on the order of one second at the laboratory scale and extends to a few seconds in manufacturing lyophilizers. The exact mechanism inducing primary ice nucleation using this technique has yet to be determined. However, current theories include gas bubble formation, accelerated supercooling, evaporation at the liquid interface, and a combination of mechanical and acoustic shock.

Understanding the rapid decompression ice nucleation in lyophilization is critical to improving lyophilization. However, to date measurement systems have been unable to make exact measurements as to crystal nucleation followed by onset of global crystallization. Such a measurement system is critical to the precise control of the lyophilization process in order to avoid deleterious effects of lyophilization process such as protein denaturation, aggregation, pH shifts, and phase separation.

Therefore, there is an unmet need for a novel approach to precisely measure ice nucleation in a lyophilization process.

SUMMARY

An environmental sensor system for monitoring nucleation in a lyophilization chamber is disclosed which includes a sensor unit, including a temperature sensor, a pressure sensor, and a reader circuit in electronic communication with the sensor unit, wherein the sensor unit is adapted to sealingly fit around a vial placed in a lyophilization chamber and further adapted to be energized by the reader circuit and provide signals associated with temperature and pressure within the vial in a non-invasive manner in which the sensors are configured to be positioned in a headspace within the vial but not in contact with product within the vial.

According to one embodiment of the environmental sensor system, the environmental sensor system further includes a relative humidity (RH) sensor adapted to provide the RH of the headspace.

According to one embodiment of the environmental sensor system, wherein the signals associated with temperature, pressure and RH are communicated wirelessly to a base station.

According to one embodiment of the environmental sensor system, wherein the wireless protocol is selected from the group consisting of Bluetooth Low Energy (BLE), WiFi, ZigBee®, Z-Wave®, Thread®, and cellular.

According to one embodiment of the environmental sensor system, wherein temperature, and relative humidity readings from the environmental sensor are used to calculate the dew point of product within the vial according to:

$$DP = \frac{\lambda\left(\ln\left(\frac{RH}{100} + \frac{\beta T}{\lambda + T}\right)\right)}{\beta - \left(\ln\left(RH/100 + \beta T/(\lambda + T)\right)\right)}$$

where RH is the relative humidity,
T is the temperature,
α=6.112 hPa (hectopascal),
β=17.62° C., and
λ=243.12° C.

A system for determining onset of nucleation in a lyophilization chamber, comprising: a lyophilization chamber; at least one vial containing a product to be lyophilized, at least one sensor unit coupled to each of the at least one vials, adapted to measure a corresponding temperature, pressure, and relative humidity (RH);
at least one pressure sensor adapted to provide absolute pressure within the lyophilization chamber;
a processor adapted to receive signals from the at least one sensor unit, the processor configured to calculate the dew point of each of the at least one vials, and based on temperature of each of the at least one vials determine if onset of nucleation has occurred.

According to one embodiment of the system, wherein the dew point is calculated based on:

$$DP = \frac{\lambda\left(\ln\left(\frac{RH}{100} + \frac{\beta T}{\lambda + T}\right)\right)}{\beta - \left(\ln\left(RH/100 + \beta T/(\lambda + T)\right)\right)}$$

where RH is the relative humidity,
T is the temperature,
α=6.112 hPa (hectopascal),
β=17.62° C., and
λ=243.12° C.

According to one embodiment of the system, wherein signals from the at least one sensor unit is received by the processor in a wireless manner.

According to one embodiment of the system, wherein the wireless protocol is selected from the group consisting of Bluetooth Low Energy (BLE), WiFi, ZigBee®, Z-Wave®, Thread®, and cellular.

A method of determining onset of nucleation in a lyophilization chamber, comprising: receiving a signal corresponding to headspace parameters from at least one sensor unit coupled to each of a corresponding vials in a lyophilization chamber, adapted to measure corresponding temperature, pressure, and relative humidity (RH) in the headspace; and
receiving a signal corresponding to absolute pressure from at least one pressure sensor receiving absolute pressure within the lyophilization chamber from a pressure sensor disposed therein; calculating the dew point of each of the at least one vials, and
based on temperature of each of the at least one vials determining if onset of nucleation has occurred.

According to one embodiment of the method, wherein the dew point is calculated based on:

$$DP = \frac{\lambda\left(\ln\left(\frac{RH}{100} + \frac{\beta T}{\lambda + T}\right)\right)}{\beta - \left(\ln\left(RH/100 + \beta T/(\lambda + T)\right)\right)}$$

where RH is the relative humidity,
T is the temperature,
α=6.112 hPa (hectopascal),
β=17.62° C., and
λ=243.12° C.

According to one embodiment of the method, the signal corresponding to headspace parameters from the at least one sensor unit is received in a wireless manner.

According to one embodiment of the method, wherein the wireless protocol is selected from the group consisting of Bluetooth Low Energy (BLE), WiFi, ZigBee®, Z-Wave®, Thread®, and cellular.

DETAILED DESCRIPTION

Figure 1:
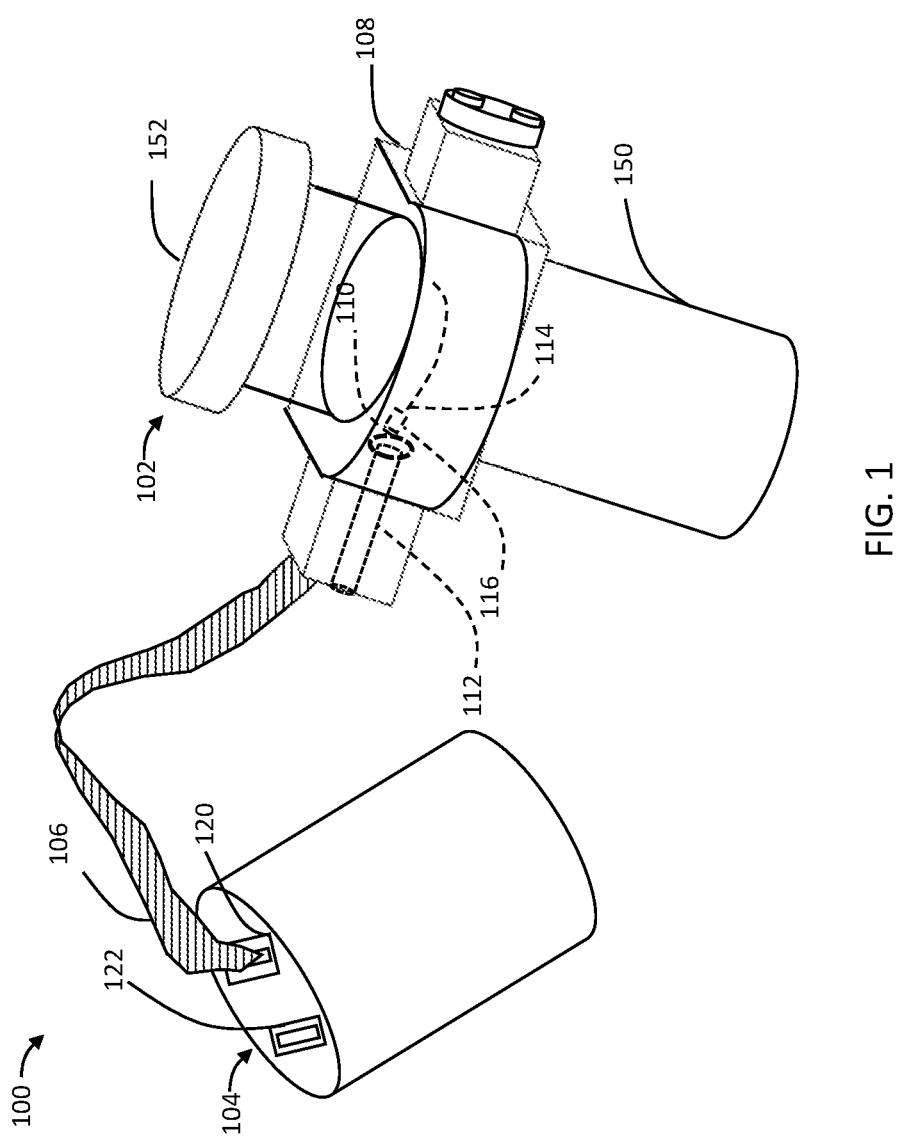
FIGS. 1 and 2 are wireless gas pressure and temperature sensor systems where one is adapted to be placed around a vial in a lyophilization chamber and measure temperature, gauge pressure, and relative humidity in the headspace in the vial (FIG. 1) and the other is adapted to be placed in the chamber to measure temperature and absolute pressure (FIG. 2).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach is described herein to precisely measure ice nucleation in a lyophilization process. Controlled ice nucleation (CIN) provides several benefits to the lyophilization cycle including a reduction in primary drying time, and more uniform product quality characteristics. According to the present disclosure, application of wireless sensors to the measurement of vial headspace and lyophilization chamber conditions provides data which can be used to further understand the rapid decompression CIN (RD-CIN) process used in lyophilization. An experimental comparison between nitrogen, argon, and helium ballast gases combined with an isentropic flow model is provided which shows that low mass monatomic gases are the most ideal candidates for optimizing the decompression process. These species produce the most rapid decompression rates and correspondingly large temperature drops during CIN. It should be noted that this isentropic assumption does not account for heat transfer between the gas and the warmer chamber walls. As part of this challenge, although helium might be the best candidate with respect to many aspects, the high thermal conductivity associated with helium further complicates this challenge. This is one reason why there is a critical need to measure temperatures directly in the vials in the headspace. The effect of the vial volume has also been explored. The obtained data indicate that large volume vials provide the most optimal conditions for primary nucleation due to the larger mass of gas present within the headspace. This behavior is indicated by the correlation between vial volume and headspace temperature reduction.

Figure 2:
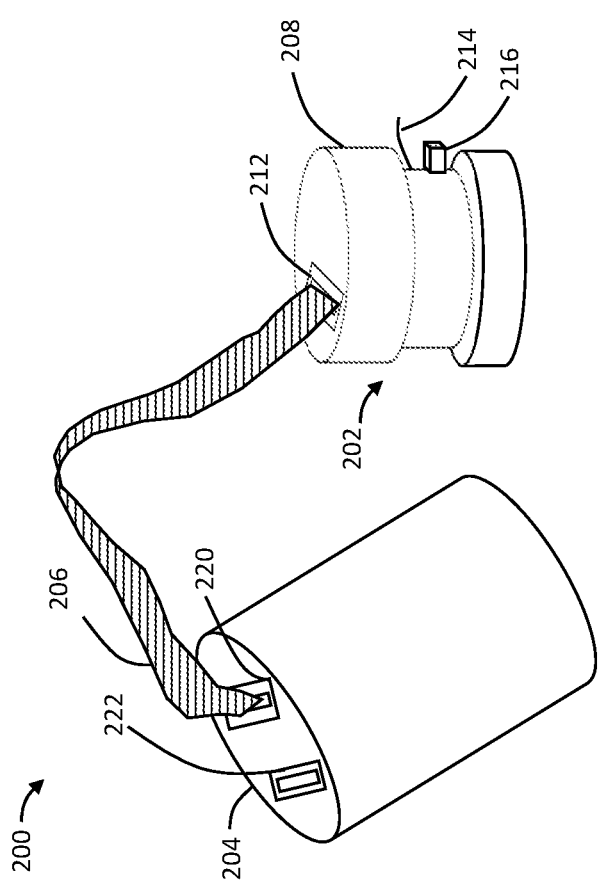

Referring to FIGS. 1 and 2, wireless gas pressure and temperature sensor systems are provided where one is adapted to be placed around a vial in a lyophilization chamber and measure temperature, gauge pressure, and relative humidity in the headspace in the vial (FIG. 1) and the other is adapted to be placed in the chamber to measure temperature and absolute pressure (FIG. 2).

The wireless gas pressure and temperature sensor systems 100 (FIG. 1) includes two components a sensor unit 102 and an electronic housing unit 104 (also referred to herein as a reader circuit). The two units (i.e., the sensor unit 102 and the electronic housing unit 104) are coupled to each other via a ribbon cable 106. The sensor unit 102 includes a body 108 adapted to fit on the outside of a vial 150 used in a lyophilization environment. The body 108 is configured to sealingly couple to the vial 150 using one more O-rings 110 (only one is shown) positioned between the body 108 and the vial 150 and adapted to generate a seal with the vial 150. The vial includes a top 152. The body 108 is in the shape of two c-clamps that are secured around the vial with hardware (not shown) or alternatively in a press-fit manner. The body 108 on one side includes a tubular cavity 112 through which a thermocouple 114, a gauge pressure sensor 116, and a relative humidity sensor (not shown) can be inserted and into the vial 150 through a pre-drilled hole (not shown) into the headspace of the vial (i.e., where there is no product).

The pressure sensor 116, the thermocouple 114, and the relative humidity sensor (not shown) are fixed in the headspace and are coupled to an electronic housing 118. The thermocouple 114, the pressure sensor 116, and the relative humidity sensor (not shown) are adapted to measure temperature, pressure, and relative humidity within the vial, respectively, in a non-invasive manner (i.e., the product in the vial is not in contact with the thermocouple 114, the gauge pressure sensor 116, or the relative humidity sensor (not shown)). The electronic housing unit 104 includes circuitry to interface with the thermocouple 114, the gauge pressure sensor 116, and the relative humidity sensor (not shown) in order to 1) power these sensing devices and then read electronic values that can be interpreted as temperature, pressure, and relative humidity correspondingly. The tubular cavity 112 once the sensors have been placed inside the vials 150 can be sealed to provide as minimal of disturbance to the product inside the vial 150.

The electronic housing unit 104 includes electronic interfaces 120 and 122 which provide connectivity either to the ribbon cable 106 or to other instrumentation devices. The electronic housing unit 104 is further adapted to wirelessly communicate information provided by the sensors to a base station (not shown). The wireless protocol and link can be selected from the group consisting of Zigbee, Bluetooth, Wi-Fi, cellular, BLE, Z-wave, Thread, and WiMax.

Similarly, the wireless gas pressure and temperature sensor systems 200, shown in FIG. 2, includes two components a sensor unit 202 and an electronic housing unit 204 (also referred to herein as a reader circuit). The two units (i.e., the sensor unit 202 and the electronic housing unit 204) are coupled to each other via a ribbon cable 206. The sensor unit 202 includes a body 208. On the body 208 there exist a thermocouple 214 and an absolute pressure sensor 216 adapted to measure temperature and pressure within a lyophilization chamber and communicate these variables to the electronic housing unit 204. The electronic housing unit 204 includes circuitry to interface with the thermocouple 214 and the absolute pressure sensor 216 in order to 1) power these sensing devices and then read electronic values that can be interpreted as temperature and pressure, correspondingly. Thereafter, the electronic housing unit 204 is further adapted to wirelessly communicate information provided by the sensors to a base station (not shown). The wireless protocol and link can be selected from the group consisting of Zigbee, Bluetooth, Wi-Fi, cellular, BLE, Z-wave, Thread, and WiMax.

The wireless gas pressure and temperature sensor systems 100 and 200 are designed and fabricated for the purpose of monitoring the CIN process. The decompression event is on the order of 1 second, requiring high sampling rates to resolve the gas pressure and temperature with sufficient temporal resolution. The favorable response time of MEMS diaphragm-based pressure sensors make them ideally suited for pressure measurement in this setting. For temperature, 40-gauge T-type thermocouples are selected to minimize thermal mass and lead conduction. Two devices are deployed for all experiments conducted in this study. The first has been designed to measure the headspace properties, outfitted with a differential pressure sensor having a full-scale range of 0.36 psig (sensor unit 102 shown in FIG. 1). A thermocouple amplifier (not shown) is cold-junction compensated, minimizing the influence of fluctuating circuit board temperatures. All transducers (pressure sensor 116, the thermocouple 114, and the relative humidity sensor (not shown) are affixed to the vial using a 3D printed bracket (shown as the body 108) and sample the headspace via one or more pre-drilled holes drilled in the vial 150 (see FIG. 1). Holes are formed using a diamond-coated drill bit with heavy water lubrication. Each hole is sealed from the chamber using BUNA rubber o-rings 110 (see FIG. 1) around the pre-drilled hole of the vial. The second device (see FIG. 2) samples the bulk chamber gas and contains and absolute pressure sensor with a range of 0 to 60 psia. The vial 150 shown in FIG. 1, can be of different sizes, 20 CC is an example size of a vial 150.

Bluetooth Low Energy (BLE) is chosen as the wireless communication protocol, according to one embodiment; however, as discussed above other wireless protocols are also possible including WiFi, ZigBee®, Z-Wave®, Thread®, and cellular. The sampling rates of both pressure and temperature are about 333 Hz, according to one implementation. Upon power-up the devices begin advertising and bond to the central host if discovered. The host will accept connection to the wireless sensors only, rejecting requests from all other BLE-capable devices in the field. On each sampling interval the pressure and temperature data are appended to a 50-byte buffer and transferred out to the host on the a-negotiated connection interval. The host then relays the data packets to the appropriate thread for processing. The data handler thread extracts time-stamped segments from the main buffer and writes them to a file. One data packet from each broadcast is fed to a monitor buffer and is displayed to the user over a custom graphical user interface. The user can activate and deactivate each sensor node from the user interface as well as enable and disable real-time data logging.

Figure 3:
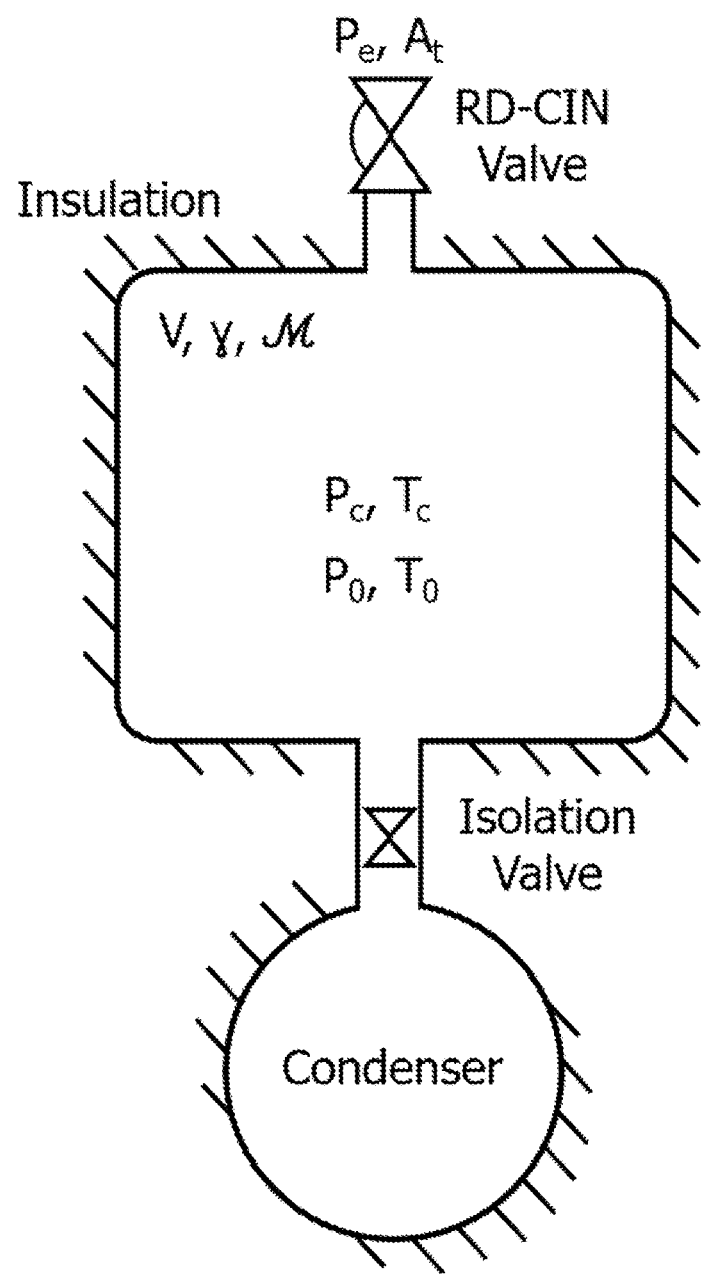
FIG. 3 is a schematic of a model domain of a lyophilization chamber where the chamber combined with the fast depressurization allows the rapid decompression controlled ice nucleation process to be modeled as adiabatic.

An insulated LYOSTAR 3 chamber combined with a fast depressurization system allows the RD-CIN process to be modeled as adiabatic. A schematic of the model domain is provided in FIG. 3. To accommodate the isentropic flow relations, the depressurization events are also assumed reversible. Under isentropic flow theory, the variation in process variables between an arbitrary point and the stagnation conditions are described by $$\frac{p}{p_0} = \left(1 + \frac{\gamma-1}{2} M^2\right)^{-\frac{\gamma}{\gamma-1}} \quad (1)$$

$$\left(\frac{p}{p_0}\right) = \left(\frac{T}{T_0}\right)^{\frac{\gamma}{\gamma-1}} = \left(\frac{\rho}{\rho_0}\right)^{\gamma} \quad (2)$$

Where p is the gas pressure,
T is temperature, and p is density, and
$\gamma$ is the heat capacity ratio of the gas. The subscript "0" represents the stagnation condition and is defined as the value that a particular process variables assumes if it is brought to rest adiabatically. Of specific relevance to compressible flow modeling is the demarcation between subsonic and supersonic regimes. At this point, the Mach number assumes a value of unity and defines the critical pressure ratio.

$$\frac{p_c}{p_e} = \left(\frac{\gamma+1}{2}\right)^{\frac{\gamma}{\gamma-1}} \quad (3)$$

where the subscripts "c" and "e" denote the chamber and exit (atmospheric) conditions, respectively. When the critical pressure ratio is exceeded, the flow is considered choked and achieves sonic velocity in the RD-CIN valve body. For ratios below the critical value, the entire flow becomes subsonic and the chamber conditions are influenced by the ambient properties outside of the lyophilizer process chamber. Chamber pressures in this study prior to depressurization are on the order of 30 psig and therefore exceed the critical choking ratio for any gas. For this reason, both the supersonic and subsonic regimes must be modeled. Application of the continuity equation to the schematic in FIG. 3 provides:

$$V\frac{\partial \rho_c}{\partial t} + \rho_e v_e A_e = 0 \quad (4)$$

Where V is the volume of the process chamber,
v is the velocity, and
A is the cross-sectional area of the orifice (duct). The exit velocity is written in terms of the Mach number and speed of sound as:

$$v_e = M_e \sqrt{\gamma R T_e} \quad (5)$$

where R is the specific gas constant. Applying the isentropic relations allows the chamber pressure to be expressed as a function of time and the stagnation conditions. In this case, the stagnation pressure and temperature are assumed constant and defined by the steady static pressure and temperature just prior to depressurization. For choked flow, the chamber pressure as a function of discharge time is written explicitly as:

$$P_c(t) = P_0 \left( t \frac{A_e}{V} \sqrt{\gamma R T_0} \left(\frac{\gamma+1}{2}\right)^{\frac{(\gamma+1)}{2(\gamma-1)}} \frac{\gamma-1}{2} + 1 \right)^{\frac{-2\gamma}{\gamma-1}} \quad (6)$$

As the pressure ratio ($P_c/P_0$) falls below the critical value the flow within the RD-CIN valve is no longer sonic. Here, the chamber pressure is not easily solved analytically and is instead left in the differential form:

$$\frac{d(P_c(t)/P_e)}{dt} = -\frac{A_e}{V} \gamma \sqrt{\gamma R T_0} \left(\frac{P_e}{P_0}\right)^{\frac{\gamma-1}{2\gamma}} \sqrt{\frac{2}{\gamma-1}\left(\left(\frac{P_c(t)}{P_e}\right)^{\frac{\gamma-1}{\gamma}} - 1\right)} \quad (7)$$

Chamber pressure for the subsonic compressible flow is calculated using a Runge-Kutta method with initial conditions set by equation 6 at the time the critical pressure ratio is reached. Equations 6 and 7 are therefore coupled to describe the complete depressurization cycle. Under the isentropic assumption the gas temperature is then estimated from equation 2 using the computed chamber pressure at any point during the depressurization.

$$T_c(t) = T_0 \left(\frac{p_c(t)}{p_0}\right)^{\frac{\gamma-1}{\gamma}} \quad (8)$$

Figure 4B:
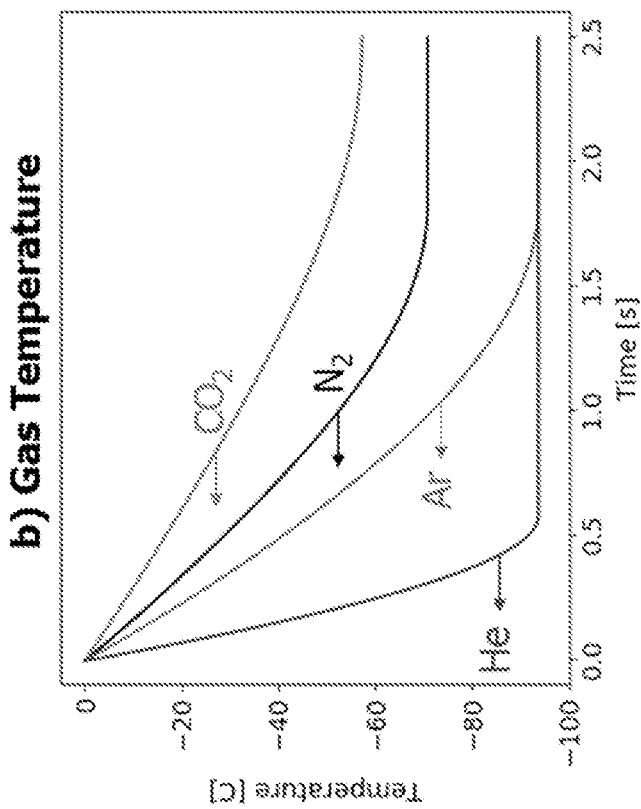
FIGS. 4a and 4b are plots of pressure in psia and temperature in ° C., respectively, each vs. time in seconds.
Figure 4A:
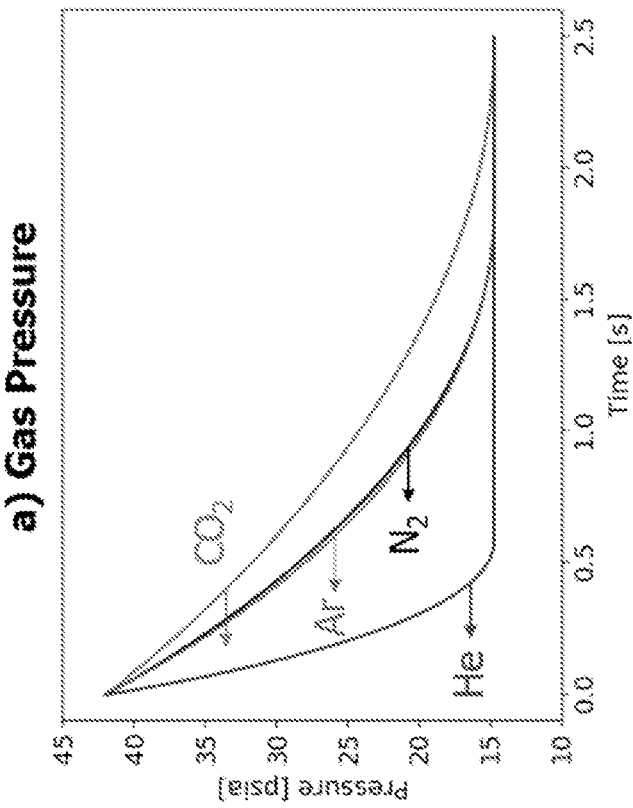

Plots of the theoretical pressure and temperature distributions for different gases over a depressurization cycle are provided in FIGS. 4*a* and 4*b*, which are plots of pressure in psia and temperature in ° C., respectively, each vs. time in seconds, which provide solutions to equations 6, 7, and 8 for chamber pressure (FIG. 4*a*) and temperature (FIG. 4*b*) using nitrogen, argon, helium, and carbon dioxide. In all cases the stagnation pressure is 43 psia and the exit pressure is standard atmosphere. Species with largest specific heat ratios attain the lowest temperature during CIN and those with the lowest mass demonstrate the most rapid decompression. From the results it is seen that species with the largest heat capacity ratios produce the lowest temperature drop from the initial state during decompression. As discussed above, although helium might be the best candidate on paper, the high thermal conductivity associated with helium reduces its effectiveness. Therefore, from a theoretical standpoint, these species are most optimal for CIN processes.

A series of RD-CIN experiments were conducted for the purpose of quantifying flow characteristics in the vicinity of the vial and within the headspace and comparing results to the isentropic model. Each vial type was tested using both nitrogen and helium ballast. The 20 cc vial was also tested with argon.

Figure 5B:
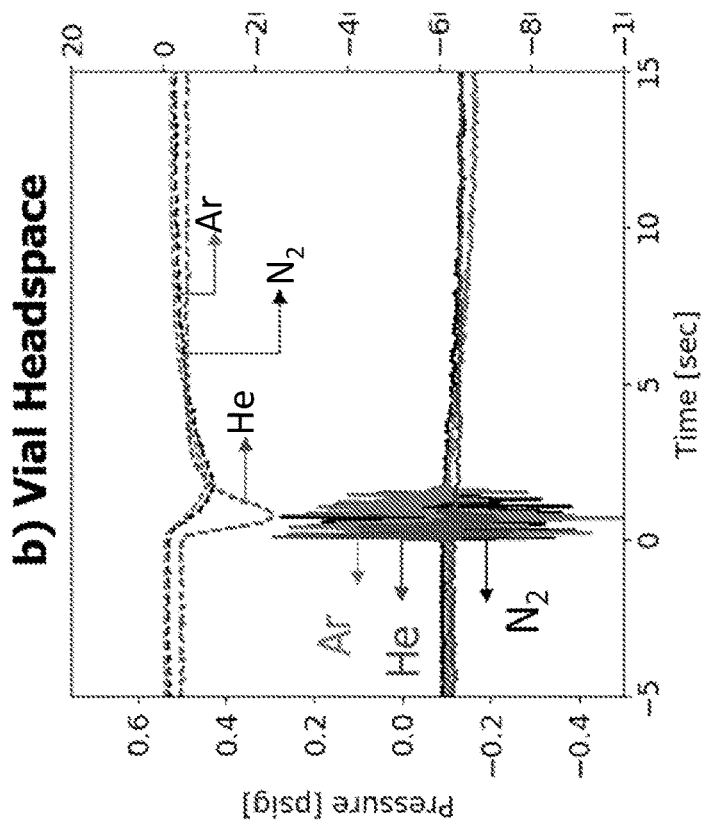
FIGS. 5a and 5b are also each plots of pressure in psia vs. time in seconds.
Figure 5A:
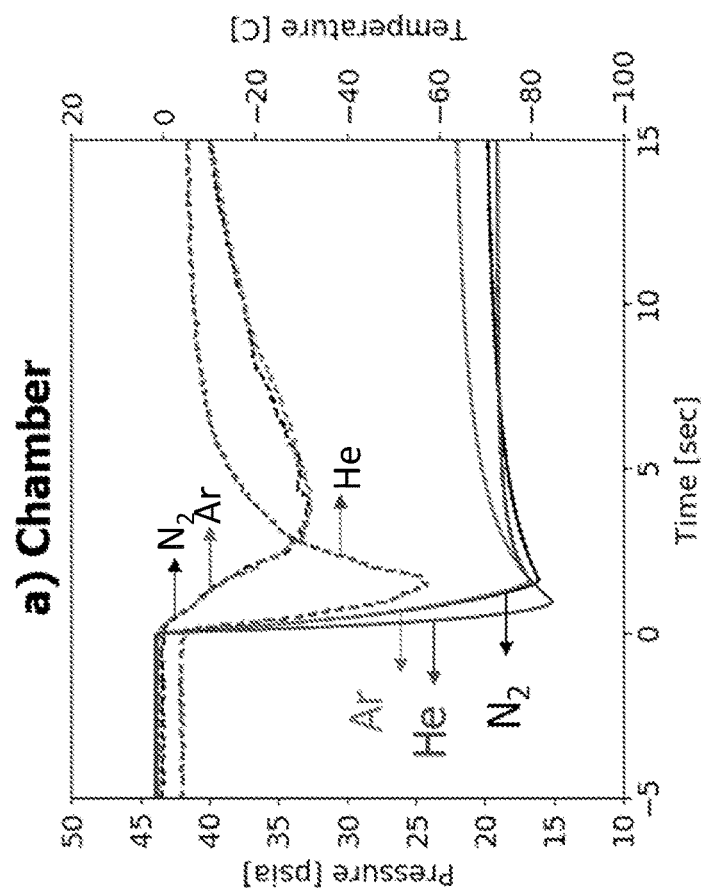
Figure 6B:
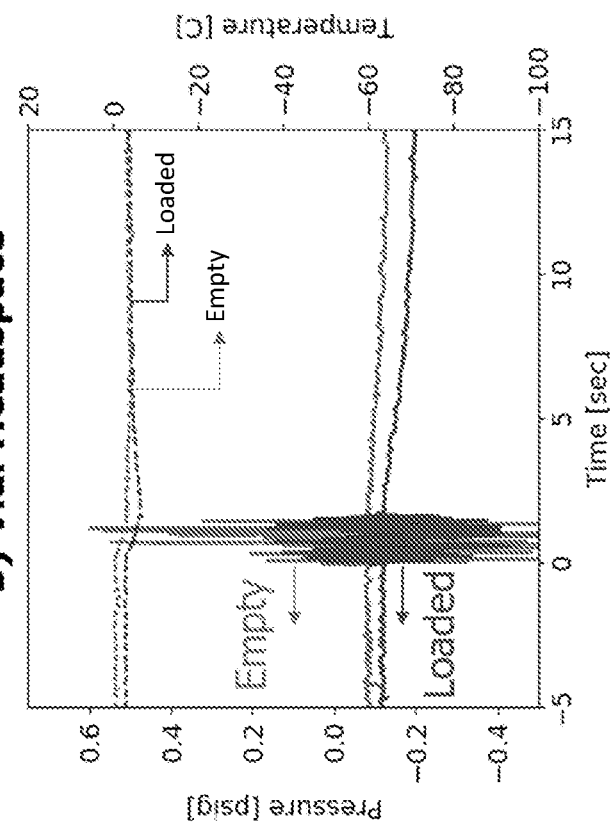
FIGS. 6a and 6b are also each plots of pressure in psia vs. time in seconds.
Figure 6A:
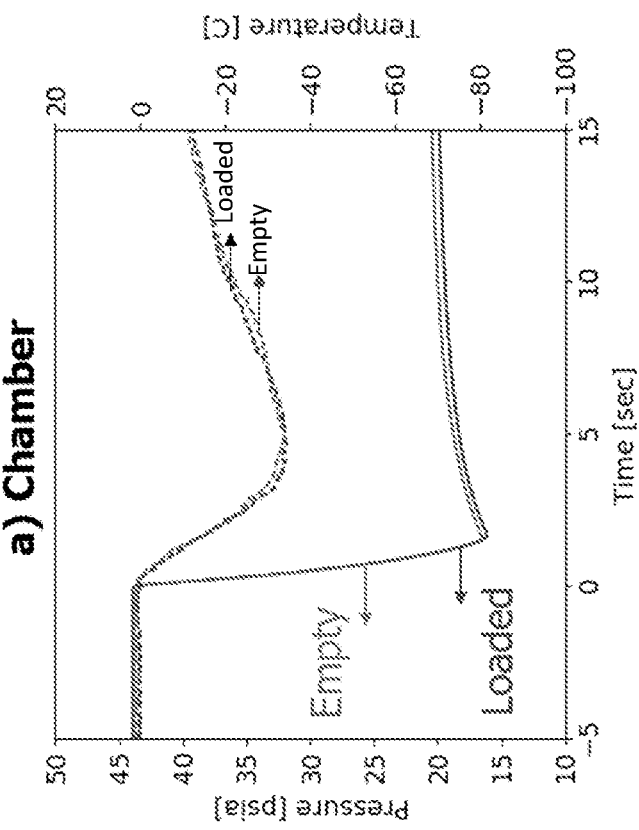

Ballast gases within the chamber and thus in the headspace affect temperature profiles. The experimental data for different ballast gases in the 20 cc vial are shown in FIGS. 5a and 5b, which are each plots of pressure in psia vs. time in seconds, and which provide comparisons of measured gas pressure and temperature in chamber (FIG. 5a) and vial headspace (FIG. 5b) during RD-CIN process using nitrogen, argon, and helium in 20 cc vials. In FIGS. 5a and 5b, as well as FIGS. 6a, 6n, 8a, 8b, 9a, and 9b, discussed below, solid lines present pressure and dashed lines present temperature. Helium decompression rate is most rapid and produces the greatest drop in temperature. Headspace temperature falls roughly 30% of the magnitude seen in the chamber. No average differential pressure is seen between the vial headspace and the chamber. Helium decompression rate is most rapid and produces the greatest drop in temperature. Headspace temperature falls roughly 30% of the magnitude seen in the chamber. No average differential pressure is seen between the vial headspace and the chamber The helium discharge is most rapid, in agreement with the result of the isentropic model. Argon and nitrogen exhibit similar decompression rates, requiring about 1.6 times longer than helium to complete. Here, the decompression time is based on absolute pressure. After RD-CIN valve closure the pressure rises by about 5 to 7 psi depending on the gas. The recovery action is due to the gradual warming of gas back to its initial state as a result of the heat transfer from the chamber walls, shelves, and supporting structure. Helium exhibits the fastest recovery due to its larger thermal diffusivity. A moving average filter has been applied to the headspace pressure data in FIG. 5b with a window of 15 samples to reduce noise. The data exhibit large oscillations during the depressurization. However, the average pressure is nearly zero for all species. This behavior is due to turbulence, mechanical vibration, diaphragm resonance or a combination of all three, a conclusion that is supported by the uniform spectrum below 166 Hz when evaluating the spectral components via Fast Fourier Transform (FFT). Common resonant frequencies for MEMS devices are on the order of 10 kHz (30 times greater than the sampling rate) and are therefore inaccessible to spectral decomposition due to the Nyquist criterion.

The isentropic theory predicts a direct correlation in gas temperature with pressure (equations 6 and 7, above), however a time lag between these measurements is observed in all cases. This time lag is defined as the span between the locations of minimum pressure and temperature during a discharge event. Two explanations that support this observation are the finite thermal diffusivity of the thermocouple (i.e. response time) and irreversibility associated with water vapor's latent heat of vaporization. Vapor cloud commonly appears during the decompression and such a phase change introduces energy into the bulk gas in the form of latent heat. To examine the influence of condensation, a series of two tests are performed, one with an empty degassed chamber and the other with a standard liquid load. A comparison of the experimental measurements for both empty and loaded chamber is provided in FIGS. 6a and 6b, which are each plots of pressure in psia vs. time in seconds, which provide comparison of discharge pressure and temperature in chamber (FIG. 6a) and vial headspace (FIG. 6b) for loaded and degassed empty chamber. In the loaded case, vial size is 20 cc and filled with 5 mL of water. Nitrogen is used as the ballast gas. Nearly identical traces indicate that the latent heat of vaporization does not contribute to the observed thermocouple time lag RMS error between model and experimental data is the cost function. All data are measured in a 20 cc vial. Both choked and subsonic flow regimes are indicated. The discrepancy in predicted and measured gas temperature results from the thermal mass of the thermocouple. The data reveal a complete agreement in measured chamber temperature for both tests. It is noted that no vapor cloud (typical of loaded CIN tests) is observed at any point during the empty decompression test but the standard cloud formed for the loaded case at roughly 75% of total discharge time (estimated through observation alone). The similarities in temperature between both cases suggests that the condensation of water vapor has little influence on the bulk gas temperature and the time lag can instead be attributed to the thermal inertia of the thermocouple and thermal conductivity of the gas. Nevertheless, the influence of thermocouple mass also explains the discrepancy between isentropic theory and measured gas temperature when using nitrogen and argon. Argon is expected to produce a temperature somewhere between helium and nitrogen. According to the thermocouple measurements, the measured gas temperature for argon and nitrogen are nearly identical in both the chamber and headspace. At the temperatures encountered during the RD-CIN, the convective heat transfer coefficient for argon is lower than nitrogen, owing to its lower thermal conductivity. Therefore, argon is less effective at transferring heat into the thermocouple. This statement, combined with the nearly equal measured temperatures suggest that the argon gas temperature is lower than nitrogen, a conclusion that is in qualitative agreement with the isentropic theory.

Figures 7A, 7B, 7C:
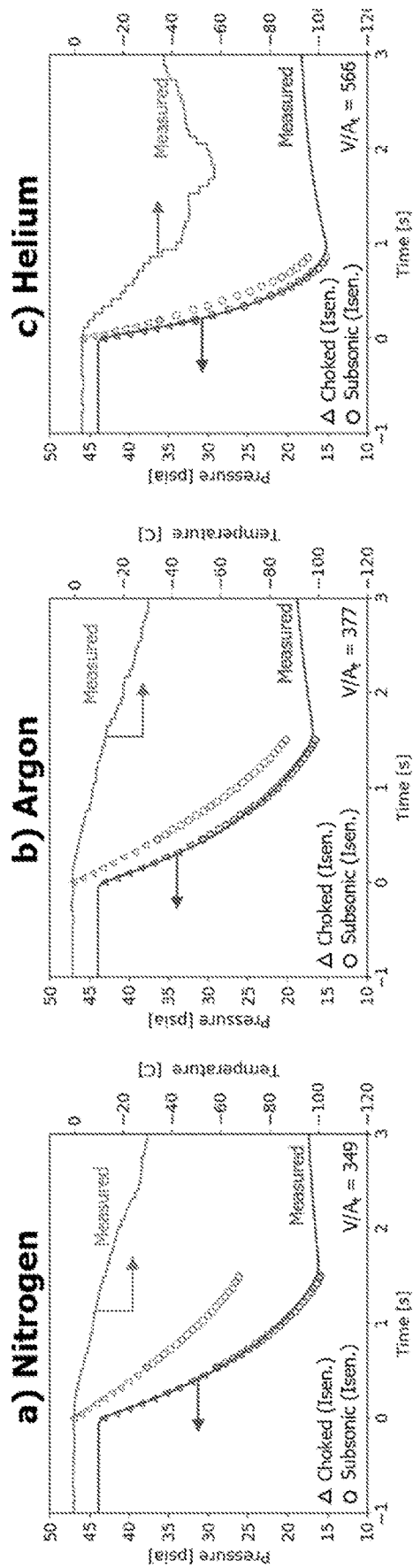
FIGS. 7a, 7b, and 7c are each complex graphs of pressure in psia and temperature in ° C. vs. time in seconds for nitrogen (FIG. 7a), Argon (FIG. 7b), and Helium (FIG. 7c).

The isentropic model equations are applied to the experimental data and the chamber volume to RD-CIN valve throat area, VIAL, is used as the fitting parameter. The optimal ratio is solved using a univariate minimization technique, taking the mean-square error between model and pressure data during the discharge as the cost function. Optimal values for nitrogen, argon, and helium are 349, 377, and 566 m, respectively. A comparison of the measured and estimated pressure and temperature during depressurization is shown in FIGS. 7a, 7b, and 7c which are each complex graphs of pressure in psia and temperature in ° C. vs. time in seconds for nitrogen (FIG. 7a), Argon (FIG. 7b), and Helium (FIG. 7c), and which provide comparison of isentropic model and experimental data using optimal V/At ratio for nitrogen (FIG. 7a), argon (FIG. 7b), and helium (FIG. 7c) gases. RMS error between model and experimental data is a measure of a cost function. All data are measured in a 20 cc vial. Both choked and subsonic flow regimes are indicated. The discrepancy in predicted and measured gas temperature results from the thermal mass of the thermocouple. Parameters used in the model equations 6, 7, and 8 are provided in Table 1. The scatter in the geometric parameter between gases is attributed to the viscous losses within the RD-CIN valve body. The isentropic model in equations 6 and 7 are derived assuming an ideal orifice flow, however in reality the RD-CIN valve is a finite length tube with an unknown series of bends or obstructions that both impart viscous losses and remove kinetic energy from the fluid. Combined, these effects invalidate the isentropic assumption in the RD-CIN valve region, resulting in the observed gas dependence. Following the fitting process, the experimental pressure data show good agreement to the fitted isentropic model. In terms of RMS error, the deviation is 0.267, 0.316, and 0.336 psi over the duration of the discharge for nitrogen, argon, and helium, respectively. As previously discussed, the large discrepancy between experimentally measured temperature and the isentropic prediction is most likely linked to the thermal inertia of the thermocouple, limiting its ability to respond to the rapid change.

TABLE 1

Parameters used in the isentropic discharge model described by equations 6, 7, and 8. $V/A_e$ is determined using a univariate minimization scheme.

| Gas | $\gamma$ | R [J/kg-K] | $P_e$ [psia] | $P_0$ [psia] | $T_0$ [C] | $V/A_e$ [m] |
|---|---|---|---|---|---|---|
| Nitrogen | 1.4 | 296.9 | 14.7 | 43.2 | 0.18 | 349 |
| Argon | 1.66 | 207.9 | 14.7 | 43.1 | 0.68 | 377 |
| Helium | 1.66 | 2078.6 | 14.7 | 43.3 | −3.46 | 566 |

Under the RD-CIN method, the formation of the vapor cloud is the key nucleation-inducing mechanism. The theoretical results presented in FIG. 4b predict a very large drop in temperature over the course of the discharge (to an absolute value around −95° C. for helium and argon, and −70° C. for $N_2$). As water vapor exits the chamber through the RD-CIN valve, its partial pressure is reduced. At some point the partial pressure is equivalent to the saturated vapor pressure and the liquid water condenses out of the bulk. This is the fundamental principle behind cloud chambers, originally published by Charles Thomson Rees Wilson in 1912 for the purpose of detecting ionizing radiation. As the gas temperature is further reduced below the dew point the suspended liquid droplets nucleate. Similar to the "ice fog" technique it is suggested that the ice crystals deposit onto the supercooled liquid and induce primary nucleation.

Comparisons of the measured chamber and headspace pressures and temperature for each vial under nitrogen and helium ballast are shown in FIGS. 7a-7c and FIGS. 8a-8b which are complex graphs of pressure in psia and temperature in ° C. vs. time for chamber (FIG. 8a) and vial (FIG. 8b), respectively, and which provide Effect of vial type on gas pressure and temperature in chamber (FIG. 8a) and vial headspace (FIG. 8b) using nitrogen gas ballast. Vial size has little effect on the chamber conditions. Larger vials result in a greater temperature drop during decompression due to the increased thermal inertia of the headspace gas (larger volume). This result supports the common observation that larger vials are easier to nucleate. Additionally, larger vials produce an average pressure drop between headspace and chamber, a behavior that is attributed to the increased volumetric flow rate. According to the data, vial type (in the studied range of 6 cc to 100 cc vial size) has no influence on chamber depressurization rate. The 100 cc vial demonstrates a positive average gauge pressure relative to the chamber during decompression, achieving a magnitude of around 0.2 psig in both cases. This result is supported by the larger vial barrel volume to stopper exit area ratio. The flow is therefore subsonic at the stopper vent throughout the entire process, forcing the pressure at this location to be equal to that of the chamber. To meet this condition, the mass flow rate out of the larger volume must be larger than that of the smaller volume. A larger mass flow rate necessitates a greater differential pressure, the result of which is observed directly in the data.

Figures 8A, 8B:
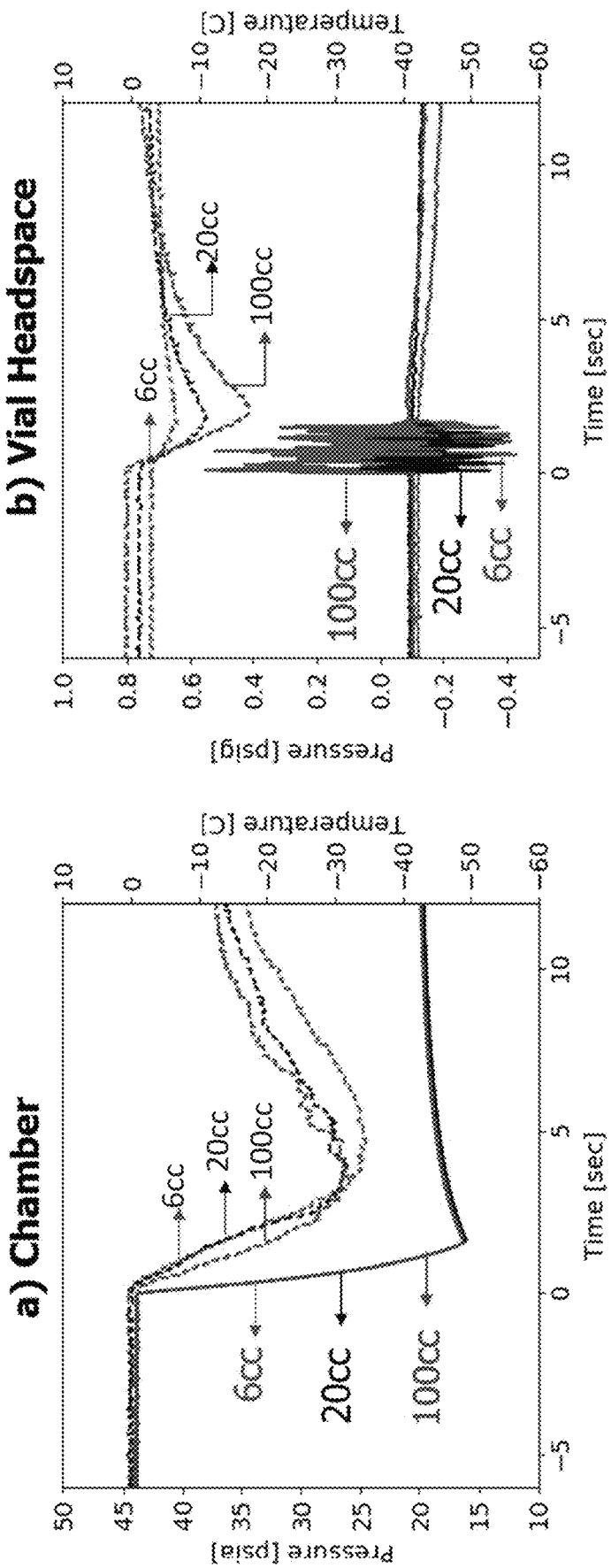
FIGS. 8a and 8b
Figures 9A, 9B:
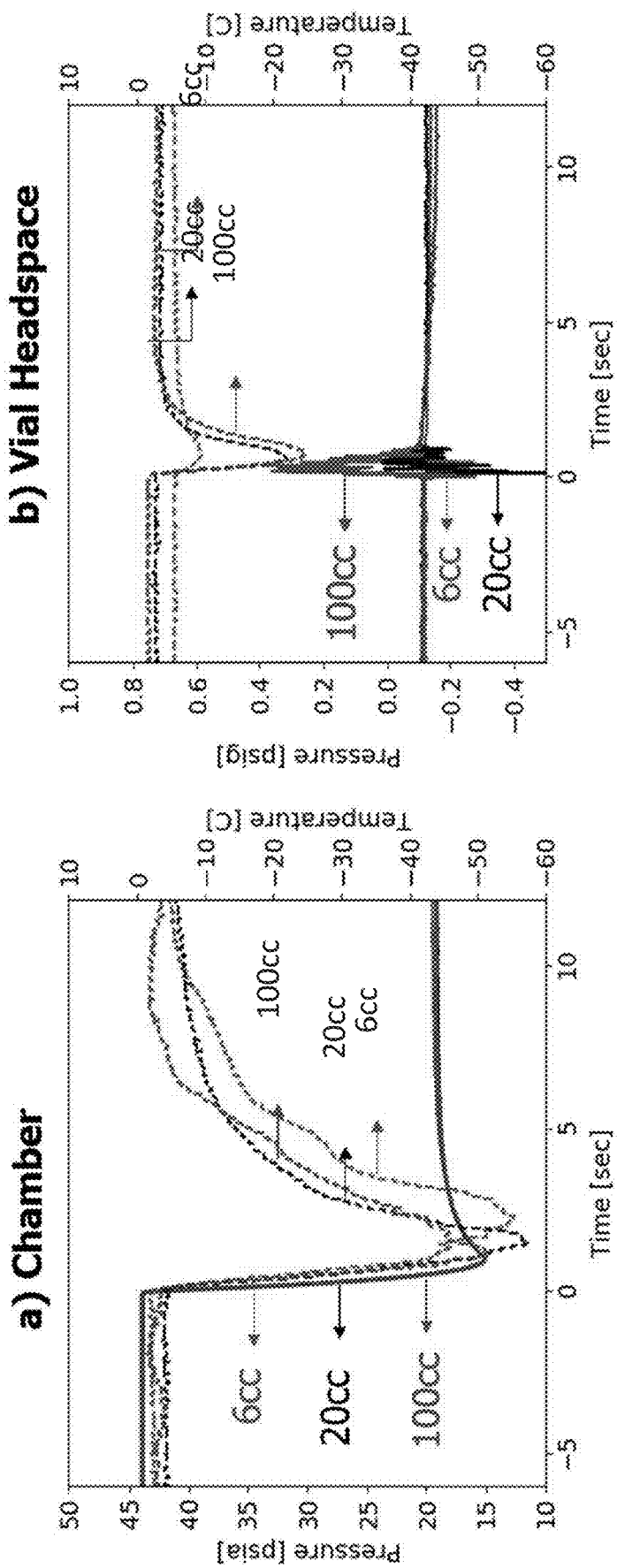

Referring to FIGS. 8a and 8b effect of vial type on gas pressure and temperature in chamber (FIG. 8a) and vial headspace (FIG. 8b) using nitrogen gas ballast are shown. Vial size has little effect on the chamber conditions. Larger vials result in a greater temperature drop during decompression due to the increased thermal inertia of the headspace gas (larger volume). This result supports the common observation that larger vials are easier to nucleate. Additionally, larger vials produce an average pressure drop between headspace and chamber, a behavior that is attributed to the increased volumetric flow rate. Referring to FIGS. 9a and 9b which are complex graphs of pressure in psia and temperature in ° C. vs. time for chamber (FIG. 9a) and vial (FIG. 9b), respectively, which provide effect of vial type on gas pressure and temperature in chamber (FIG. 9a) and vial headspace (FIG. 9b) using helium gas ballast are shown. Similar behavior is observed relative to the nitrogen case however temperature drop magnitudes are greater by around 25% in the headspace and 50% in the chamber. The temperature recovery is much more rapid due to the high thermal conductivity of helium. As seen in FIGS. 8b and 9b, the smallest vial volume leads to the smallest decrease in headspace temperature. This behavior is supported by the empirical observation that smaller vials are less susceptible to nucleation under identical operating conditions. The 6 cc vial necessarily contains a smaller mass of gas just prior to decompression than the 20 cc or 100 cc vials and therefore has a shorter thermal time constant. With the walls of the borosilicate vials remain at a constant temperature during the discharge, the temperature of headspace gas in small vials shall remain at a higher temperature during discharge. The thermocouple responds much more quickly during helium decompression due to the higher thermal conductivity and lower temperature magnitude. The temperature recovery following RD-CIN valve closure is also much more rapid for helium, equilibrating around 66% faster.

Figure 10:
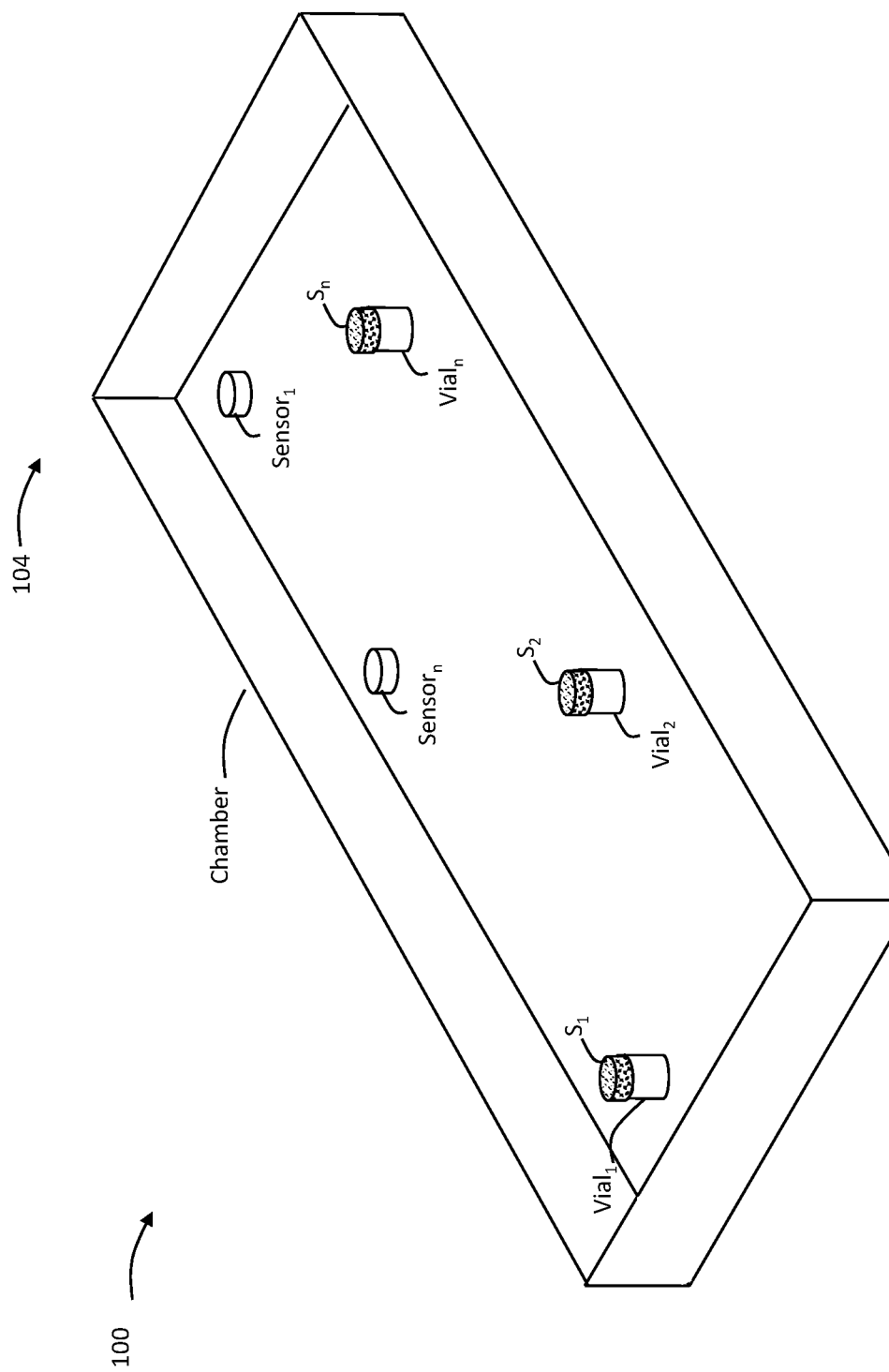

Referring to FIG. 10, a schematic of a lyophilization chamber is shown with n vials (shown as $Vial_1$, $Vial_2$, . . . $Vial_n$), with n chamber sensors (shown as sensors $Sensor_1$ . . . $Sensor_n$). Each Vial includes a sensor pack (shown as $S_1$ . . . $S_n$). A combination of temperature, pressure, and relative humidity sensors distributed amongst $S_1$ . . . $S_n$ and $Sensor_1$ . . . $Sensor_n$, dewpoint in each vial can be calculated and by knowing the temperature in each vial, start of nucleation can be established to ensure proper lyophilization in each vial. This onset of nucleation in each vial can be used as a feedback signal in a lyophilization system according to the present disclosure to tailor the proper ambient conditions inside the chamber for maximum efficiency.

Dew point (DP) is a critical parameter and which can be measured by the relative humidity sensor (not shown) discussed in reference to FIG. 1. Crossing the DP signals onset of nucleation of ice. The DP is the temperature at which air is supersaturated. Any further decrease in temperature causes water to condense out into a cloud. Since during lyophilization, the conditions are well below the equilibrium freezing temperature, the liquid water droplets will immediately freeze. These particles become nucleation sites after contacting the supercooled formulation. To calculate the dew point, the saturation pressure in each vial is calculated based on the following formula:

$$EW = \alpha e^{\left(\frac{\beta T}{\lambda + T}\right)} \quad (9)$$

Where α, β, and λ are coefficients having the following values for T between −45° C. and 60° C.:
α=6.112 hPa,
β=17.62° C., and
λ=243.12° C. From (9), the dew point (DP) can be calculated as provided in the equation below:

$$DP = \frac{\lambda \ln\left(\frac{E}{\alpha}\right)}{\beta - \ln\left(\frac{E}{\alpha}\right)} \quad (10)$$

Where, E=RH·EW/100, and
RH is the relative humidity. By manipulating the above equations and using the appropriate values for the aforementioned coefficients the dew point formula is provided below for a specific temperature (T) and a specific relative humidity (RH):

$$DP = \frac{\lambda\left(\ln\left(\frac{RH}{100} + \frac{\beta T}{\lambda + T}\right)\right)}{\beta - \left(\ln\left(\frac{RH}{100} + \frac{\beta T}{\lambda + T}\right)\right)} \quad (11)$$

By calculating DP for each vial, and measuring T in each vial, one can determine if nucleation has successfully occurred in the vial. Towards this end, several different sensor configuration is possible: 1) temperature sensors in each vial, 2) temperature sensors in each vial and/or in the chamber, 3) pressure sensors in each vial, 4) pressure sensors in each vial and/or the chamber, 5) relative humidity in each vial, and 6) relative humidity sensor in each vial and/or in the chamber. It should be noted that FIGS. 1 and 2 provide pressure and temperature sensors for the vial and chamber, however, each of these sensors shown in FIGS. 1 and 2 can additionally incorporate relative humidity sensors therein.

Those having ordinary skill in the art will recognize that numerous modifications can be made to the specific implementations described above. The implementations should not be limited to the particular limitations described. Other implementations may be possible.

The invention claimed is:

1. An environmental sensor system for monitoring nucleation in a lyophilization chamber, comprising:
a sensor unit, including
a temperature sensor,
a pressure sensor; and
a reader circuit in electronic communication with the sensor unit;
wherein the sensor unit is adapted to sealingly fit around a vial placed in a lyophilization chamber and further adapted to be energized by the reader circuit and provide signals associated with temperature and pressure within the vial in a non-invasive manner in which the sensors are configured to be positioned in a headspace within the vial but not in contact with product within the vial.

2. The environmental sensor system of claim 1, further comprising a relative humidity (RH) sensor adapted to provide the RH of the headspace.

3. The environmental sensor system of claim 2, wherein the signals associated with temperature, pressure and RH are communicated wirelessly to a base station.

4. The environmental sensor system of claim 3, wherein the wireless protocol is selected from the group consisting of Bluetooth Low Energy (BLE), WiFi, ZigBee®, Z-Wave®, Thread®, and cellular.

5. The environmental sensor system of claim 1, wherein temperature, and relative humidity readings from the environmental sensor are used to calculate the dew point of product within the vial according to:

$$DP = \frac{\lambda\left(\ln\left(\frac{RH}{100} + \frac{\beta T}{\lambda + T}\right)\right)}{\beta - \left(\ln\left(RH/100 + \beta T/(\lambda + T)\right)\right)}$$

where RH is the relative humidity,
T is the temperature,
α=6.112 hPa (hectopascal),
β=17.62° C., and
λ=243.12° C.

6. A system for determining onset of nucleation in a lyophilization chamber, comprising:
a lyophilization chamber;
at least one vial containing a product to be lyophilized,
at least one sensor unit coupled to each of the at least one vials, adapted to measure a corresponding temperature, pressure, and relative humidity (RH);
at least one pressure sensor adapted to provide absolute pressure within the lyophilization chamber;
a processor adapted to receive signals from the at least one sensor unit, the processor configured to calculate the dew point of each of the at least one vials, and
based on temperature of each of the at least one vials determine if onset of nucleation has occurred.

7. The system of claim 6, wherein the dew point is calculated based on:

$$DP = \frac{\lambda\left(\ln\left(\frac{RH}{100} + \frac{\beta T}{\lambda + T}\right)\right)}{\beta - \left(\ln\left(RH/100 + \beta T/(\lambda + T)\right)\right)}$$

where RH is the relative humidity,
T is the temperature,
α=6.112 hPa (hectopascal),
β=17.62° C., and
λ=243.12° C.

8. The system of claim 6, wherein the signals from the at least one sensor unit is received by the processor in a wireless manner.

9. The system of claim 6, wherein the wireless protocol is selected from the group consisting of Bluetooth Low Energy (BLE), WiFi, ZigBee®, Z-Wave®, Thread®, and cellular.

10. A method of determining onset of nucleation in a lyophilization chamber, comprising:
receiving a signal corresponding to headspace parameters from at least one sensor unit coupled to each of a corresponding vials in a lyophilization chamber, adapted to measure corresponding temperature, pressure, and relative humidity (RH) in the headspace; and receiving a signal corresponding to absolute pressure from at least one pressure sensor receiving absolute pressure within the lyophilization chamber from a pressure sensor disposed therein;

a processor calculating the dew point of each of the at least one vials, and based on temperature of each of the at least one vials determining if onset of nucleation has occurred.

11. The method of claim 10, wherein the dew point is calculated based on:

$$DP = \frac{\lambda\left(\ln\left(\frac{RH}{100} + \frac{\beta T}{\lambda + T}\right)\right)}{\beta - (\ln(RH/100 + \beta T/(\lambda + T)))}$$

where RH is the relative humidity,
T is the temperature,
$\alpha$=6.112 hPa (hectopascal),
$\beta$=17.62° C., and
$\lambda$=243.12° C.

12. The method of claim 10, the signal corresponding to headspace parameters from the at least one sensor unit is received in a wireless manner.

13. The system of claim 12, wherein the wireless protocol is selected from the group consisting of Bluetooth Low Energy (BLE), WiFi, ZigBee®, Z-Wave®, Thread®, and cellular.

* * * * *